(12) United States Patent
Wu (10) Patent No.: US 11,585,329 B1
(45) Date of Patent: Feb. 21, 2023

(54) SUBMERGED GEOTHERMAL POWER GENERATION SYSTEM

(71) Applicant: ELAND BLOCKCHAIN FINTECH INC., San Jose, CA (US)

(72) Inventor: Ching Song Wu, Taipei (TW)

(73) Assignee: ELAND BLOCKCHAIN FINTECH INC., San Jose, CA (US)

(*) Notice: Subject to any disclaimer, the term of this patent is extended or adjusted under 35 U.S.C. 154(b) by 0 days.

(21) Appl. No.: 17/816,117

(22) Filed: Jul. 29, 2022

(51) Int. Cl.
| | |
|---|---|
| *F03G 4/00* | (2006.01) |
| *H02N 11/00* | (2006.01) |
| *F24T 50/00* | (2018.01) |
| *F24T 10/10* | (2018.01) |

(52) U.S. Cl.
CPC ............ *F03G 4/029* (2021.08); *F03G 4/037* (2021.08); *F24T 10/10* (2018.05); *F24T 50/00* (2018.05); *H02N 11/002* (2013.01)

(58) Field of Classification Search
CPC .......... F03G 4/029; F03G 4/037; F24T 10/10; F24T 50/00; H02N 11/002
USPC ............................................. 60/641.2–641.4
See application file for complete search history.

(56) References Cited

U.S. PATENT DOCUMENTS

| | | | | |
|---|---|---|---|---|
| 5,183,100 A | * | 2/1993 | Harrell, Jr. .............. | F24T 10/30 62/238.7 |
| 7,810,330 B1 | * | 10/2010 | Weaver .................... | F01K 25/10 60/641.1 |
| 2006/0137349 A1 | * | 6/2006 | Pflanz ................. | F28D 20/0052 60/641.2 |
| 2015/0021924 A1 | * | 1/2015 | Parella, Sr. .......... | H02K 7/1807 165/45 |
| 2019/0093641 A1 | * | 3/2019 | Sumrall .................... | F03G 7/04 |

* cited by examiner

Primary Examiner — Hoang M Nguyen
(74) Attorney, Agent, or Firm — McClure, Qualey & Rodack, LLP (57) ABSTRACT

A subterranean geothermal power generation system is disclosed herein, comprising a closed cavity, a temperature differential mechanical power generation device, an electric power generation device and a heat conduction module. The mechanical power generation device with a heat source end and a cold source end and the electric power generation device are integrated into the cavity. The heat source end is exposed from the cavity for contacting with a heat source in the well; the cold source end and the electric power generation device are located in the cavity. A heat conduction fluid is filled into the cavity, the heat conduction module extends from the cavity to the outside of the well. Accordingly, a temperature difference between the cold source end and the heat source end is created to enable the mechanical power generation device to mechanically drive the electric power generation device to generate electricity.

10 Claims, 7 Drawing Sheets

SUBMERGED GEOTHERMAL POWER GENERATION SYSTEM

BACKGROUND OF THE INVENTION

Field of the Invention

The present invention relates to a subterranean geothermal power generation system, in particular to a power generation equipment that utilizes an underground heat source such as geothermal energy or a hot spring to generate electricity.

Description of the Related Art

Geothermal power generation is low-carbon or even zero-carbon clean renewable energy helpful in reducing environmental pollution and mitigating global warming, and the most important feature of geothermal power generation lies in grid stability that green energy such as wind and solar energy lacks. Geothermal power generation which is not affected by the weather and can stably generate electricity 24 hours a day has a small footprint, a low land utilization rate and a low impact on environmental ecology, and hence geothermal power generation is being developed in full swing around the world.

A related prior art of a geothermal power generation system is disclosed in PCT Publication No. WO2019/067618, entailed "Systems and Methods of Generating Electricity Using Heat from within the Earth", in which the technique of utilizing a Stirling engine is disclosed in the embodiment shown in FIG. 10. This prior art mainly utilizes a "dry hole" to obtain geothermal energy. The so-called "dry hole" refers to a hole drilled for oil or gas exploration and is quite deep, often exceeding 10,000 feet. In the embodiment shown in FIG. 10 of this patent literature, a heat conduction fluid is urged to the bottom of the dry hole by a pump for heat exchange so that the heat conduction fluid is heated and then pumped up to the earth surface so as to drive the Stirling engine for power generation. However, this manner has to consume a large amount of energy for forced circulation of the heat conduction fluid 40, especially for pumping water from a depth of 10,000 feet to the earth surface and then urging water on the earth surface into the well, and the energy consumption is huge.

Also, another prior art is shown in US Patent Publication No. 2008/0209904, entitled "Systems and Methods for Generating Electricity Using a Stirling Engine." In FIG. 4 of this patent literature, a Stirling engine is installed in a low-temperature water body with a cold end being brought into contact with the low-temperature water body, and, similarly, a heat conduction fluid is urged to the bottom of a dry hole by a pump for heat exchange and then pumped out for heat exchange with a hot end of the Stirling engine. However, construction work for this arrangement is difficult, and it is unfavorable in repair or maintenance; importantly, it has to consume a large amount of energy for forced circulation of the heat conduction fluid.

Yet another prior art is shown in PCT Patent Publication No. WO2010/102379, entitled "Heat Engine Apparatus for USE in Wellbore and Related Method", which discloses a heat engine (for example, a Stirling engine) is disposed in a wellbore, and a heat exchange fluid is circulated forcibly by a pump, wherein after the heat exchange fluid is heated at the bottom of the well, the heat exchange fluid is pumped by the pump to a hot end of the heat engine for heat exchange. Next, the heat exchange fluid is pumped to a heat exchange fluid reservoir on the earth ground and then flows into another heat exchanger for cooling; after the heat exchange fluid is cooled, the heat exchange fluid is pumped to a cold end of the heat engine for heat exchange; finally, the heat exchange fluid is pumped to the bottom of the well again for heating, thereby forming a circulation loop. However, this prior art also has to consume a large amount of energy for forced circulation of the heat exchange fluid, circulation pipes are long and complicated, and construction work is difficult. Moreover, hot spring water tends to cause the pipelines to be clogged and corroded, thereby increasing equipment maintenance costs and reducing its service life.

As can be seen from the above, it is necessary to dig a deep hole to obtain a heat source for the existing geothermal power generation systems, construction work requires much labor, and uninterrupted circulation of a heat conduction fluid is necessary for generating temperature difference by heating and cooling the heat conduction fluid. Since the forced circulation of the heat conduction fluid consumes a large amount of energy so that the cost of power generation may be greater than the benefit of power generation, they are never put into commercial operation. In addition, construction cost is expensive, and repair and maintenance are inconvenient.

SUMMARY OF THE INVENTION

The main object of the present invention is to provide a subterranean geothermal power generation system which is capable of automatically and stably generating electric power all the times and has no need of additional energy for maintaining the system operation. Electricity generated is completely output with excellent power generation efficiency; no groundwater extraction is required, it has a small footprint and a low impact on the environment; the entire generator set is placed into a well and can be easily hoisted out when maintenance or repair is required, so equipment cost, construction cost and maintenance cost are inexpensive.

In order to achieve the above object, a subterranean geothermal power generation system of the present invention mainly comprises a closed cavity, a temperature differential mechanical power generation device, an electric power generation device, a heat conduction module and a heat conduction fluid; the closed cavity is placed into a well which provides a heat source; the temperature differential mechanical power generation device includes a heat source end and a cold source end and is disposed in the closed cavity, wherein the heat source end is exposed from the closed cavity and brought into contact with the heat source, and the cold source end is located in the closed cavity; the electric power generation device is mechanically connected to the temperature differential mechanical power generation device and housed in the closed cavity, wherein when a temperature difference between the heat source end and the cold source end of the temperature differential mechanical power generation device reaches a specific value, the temperature differential mechanical power generation device mechanically drives the electric power generation device to generate electricity; the heat conduction module includes a first end and a second end, wherein the first end is located in the closed cavity, and the second end extends out of the well; the heat conduction fluid is filled into the closed cavity, and the cold source end of the temperature differential mechanical power generation device, the electric power generation device and the first end of the heat conduction module are immersed in the heat conduction fluid.

As can be seen from the above, in the present invention, the entire generator set is integrated in the single closed cavity and can be hoisted and placed into the well, wherein the heat source end of the temperature differential mechanical power generation device is exposed from the closed cavity and brought into contact with the heat source in the well; the cold source end and the electric power generation device are located in the closed cavity; and by means of the heat conduction liquid and the heat conduction module, the temperature in the closed cavity is maintained at the same temperature as the temperature outside the well, thereby forming a significant temperature difference between the cold source end and the heat source end for operation of the temperature differential mechanical power generation device. Accordingly, the present invention has no need of additional energy for assisting the operation of the system, is capable of automatically generating electric power all the times and not affected by the weather; and the present invention has no need of extraction of heat source (such as hot spring water), has a low impact on the environment and can be used for sustainable power generation; moreover, the entire generator set can be hoisted and placed into the well after the well is dug and can be directly hosted out when maintenance is required, installation and maintenance are convenient, and the equipment and construction costs are inexpensive.

DESCRIPTION OF THE PREFERRED EMBODIMENTS

Before a subterranean geothermal power generation system according to the present invention is described in detail in the embodiments, it should be noted that in the following description, similar components will be designated by the same reference numerals. Furthermore, the drawings of the present invention are for illustrative purposes only, they are not necessarily drawn to scale, and not all details are necessarily shown in the drawings.

Figure 1:
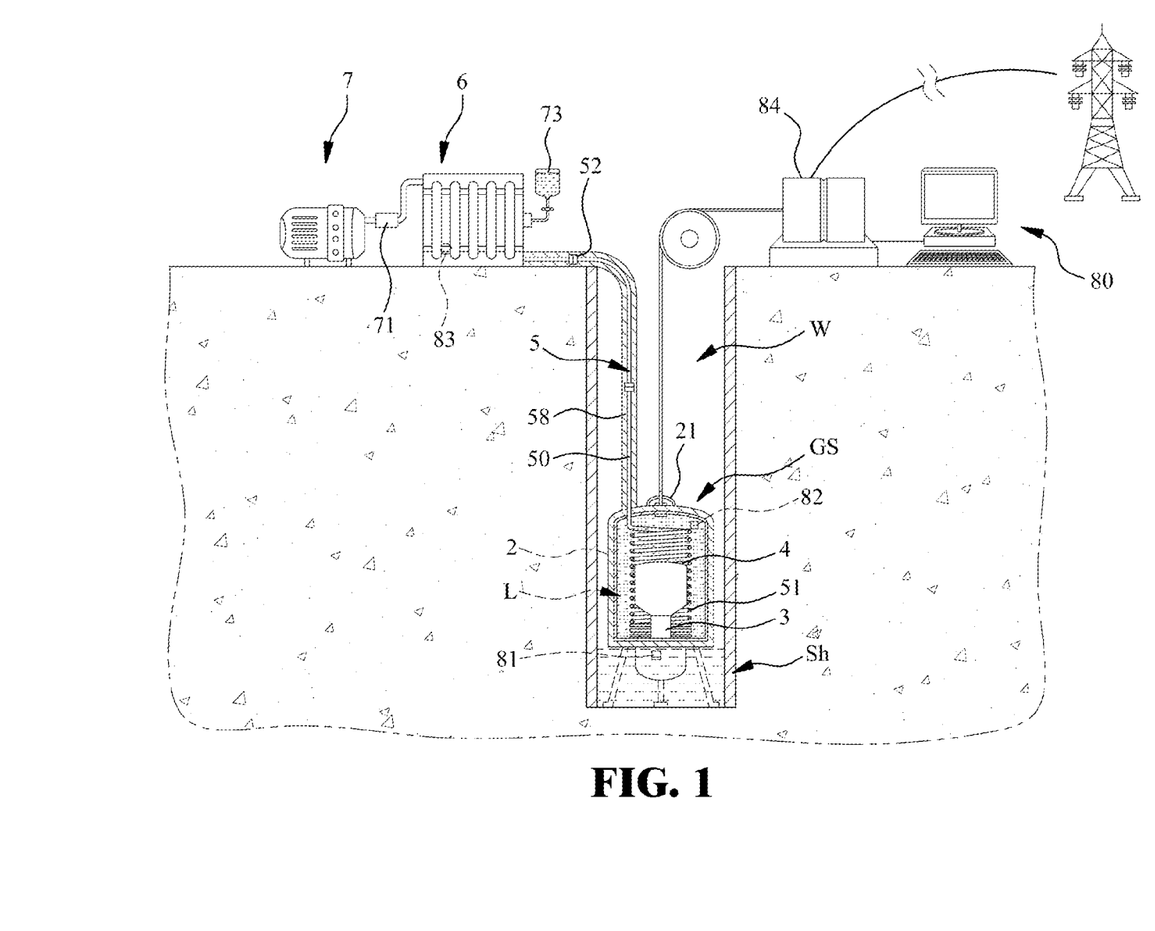
FIG. 1 is a schematic diagram of a first embodiment of the present invention.
Figure 2:
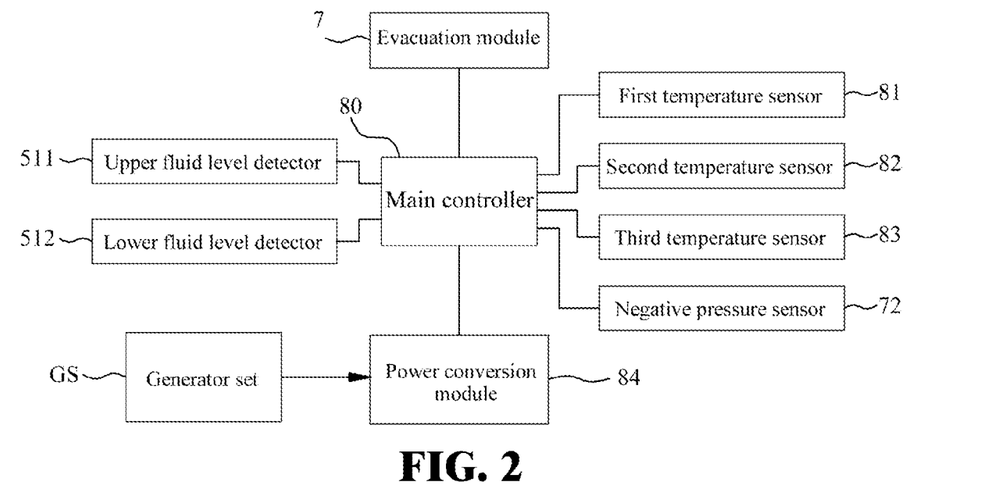
FIG. 2 is an architecture diagram of a system according to the first embodiment of the present invention.
Figure 3:
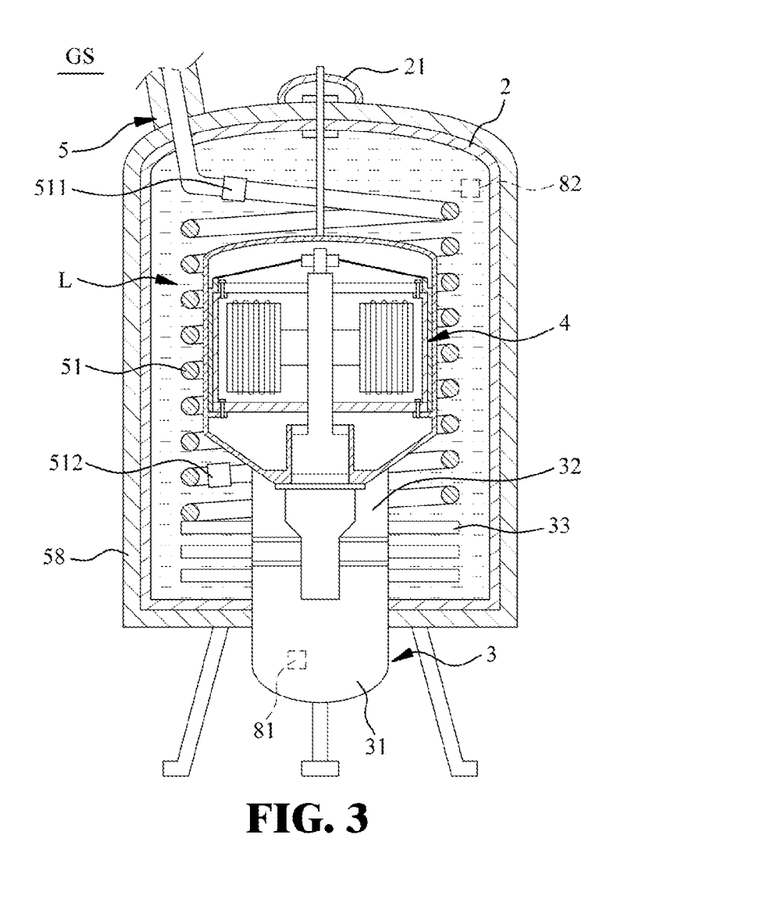
FIG. 3 is a schematic cross-sectional view of a generator set according to a preferred embodiment of the present invention.

Reference is made to FIG. 1, FIG. 2 and FIG. 3 at the same time, in which FIG. 1 is a schematic diagram of a first embodiment of the present invention, FIG. 2 is an architecture diagram of a system according to the first embodiment of the present invention, and FIG. 3 is a schematic cross-sectional view of a generator set according to a preferred embodiment of the present invention. As shown in the figure, the generator set GS of this embodiment is placed at the bottom of a hot spring well W, the hot spring well W of this embodiment may not necessarily be deep as long as a hot spring or geothermal soil of 80° C. or above can be obtained. Taking Chihpen District, Taitung County, Taiwan as an example, in many hot spring areas, there is a hot spring of 70° C. to 90° C. or above when a well is dug to a depth of 30 m to 50 m. Moreover, since it is not necessary to pump water for use, this embodiment is not limited by the amount of water and a water depth of a few centimeters or even water-bearing soil or high-temperature geothermal soil is sufficient. Compared with the traditional geothermal wells with depths of several thousands meters or more, the hot spring well W used in this embodiment obviously has the advantage of construction time and construction cost, and the exploration is also easier.

Furthermore, the generator set GS of this embodiment mainly includes a closed cavity 2, a temperature differential mechanical power generation device 3 and an electric power generation device 4, wherein the temperature differential mechanical power generation device 3 of this embodiment adopts a Stirling engine, but the present invention is not limited to this, and other heat engines capable of generating mechanical power by utilizing temperature difference can be applied hereto. The temperature differential mechanical power generation device 3 is disposed in the closed cavity 2 and includes a heat source end 31 and a cold source end 32, the heat source end 31 is exposed from the closed cavity 2 and brought into contact with a heat source Sh (hot spring water or high-temperature soil) in the hot spring well W, and the cold source end 32 is located in the closed cavity 2.

Since the heat source end 31 of the temperature differential mechanical power generation device 3 of this embodiment is immersed in the hot spring for a long time, corrosion or scaling inevitably occurs; for this reason, the heat source end 31 of this embodiment adopts a stainless steel housing and is covered with a nickel alloy 625 (Inconel®625), which has good corrosion resistance and can resist scaling and oxidation especially at high temperature. In addition, the outer surface of the heat source end 31 can also be coated with carbon nitride, boron nitride or other materials containing carbon or boron to further prevent or suppress scaling and corrosion.

The housing of the cold source end 32 of the temperature differential mechanical power generation device 3 in this embodiment is provided with fins 33 for promoting heat exchange, thereby facilitating the heat exchange rate between the cold source end 32 and a heat conduction fluid L. The electric power generation device 4 of the present embodiment is a linear alternating current generator, which is mechanically connected to the temperature differential mechanical power generation device 3 and is housed in the closed cavity 2. When the temperature difference between the heat source end 31 and the cold source end 32 of the temperature differential mechanical power generation device 3 reaches a specific value, usually about 45° C. to 55° C. or higher, the temperature differential mechanical power generation device 3 automatically operates and mechanically drives the electric power generation device 4 to generate and output electricity.

In addition, the heat conduction fluid L which may be pure water is filled into the closed cavity 2. However, in this embodiment, a nanofluid having the features such as high heat capacity and high thermal conductivity is used and is mainly composed of two components, i.e. nanoparticles and a base fluid, wherein the nanoparticles may be of metal, metal oxide, carbide, carbon nanotubes, graphene, wherein nano metal particles are preferably of magnesium; the base fluid may be water, glycol, oil, wherein the oil is preferably synthetic heat conduction oil Therminol®. Furthermore, other additives, such as anti-corrosion additives and dispersants to resist agglomeration of nanoparticles, may also be added.

Regarding the heat conduction module 5, the present embodiment adopts a heat pipe, which includes a first end 51 and a second end 52, wherein the first end 51 is located in the closed cavity 2, and in order to increase the heat transfer effect, the first end 51 is arranged in a spiral shape along the length direction of the closed cavity 22 around the cold source end 32 of the temperature differential mechanical power generation device 3 and the electric power generation device 4, thereby obtaining a better heat exchange effect. It should be particularly noted that the heat conduction module 51 of the present invention is not limited to the heat pipe and may also be a heat conduction member having an excellent heat conduction effect such as a thermosiphon, a thermal conductive graphite sheet, and a vapor chamber.

Figure 4A:
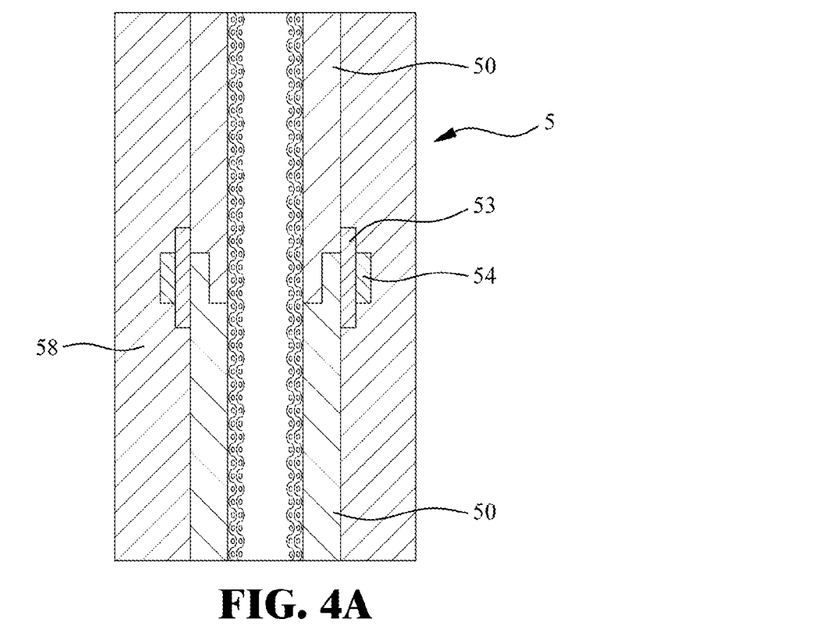
FIG. 4A is a schematic partial cross-sectional view of a heat conduction module according to a preferred embodiment of the present invention.

Reference is made to FIG. 4A, which is a schematic partial cross-sectional view of the heat conduction module according to a preferred embodiment of the present invention. In the light of the fact that the heat conduction module 5 may have a length of 30 m or more, the present embodiment particularly adopts an on-site assembled heat pipe which is formed at the construction site by assembling preformed heat pipe sections 50, wherein each heat pipe section 50 is provided with a capillary structure which is a multi-layer copper mesh structure adopted in this embodiment. As shown in FIG. 4A, two heat pipe sections 50 are connected and fitted into one another, and then, the joint is covered with a sealing material 53, such as fluororubber or fluororesin, and secured by a tube clamp 54 on the outermost surface. Because the outside of the pipe is at one atmospheric pressure and the inside of the pipe is close to a vacuum, an excellent air-tight effect like the air-tight effect of a tire valve can be achieved by means of the sealing material 53. Moreover, the heat pipe sections 50 in this embodiment are removably assembled; not only it can be assembled at the site as required, but also equipment maintenance or replacement of the heat pipe sections 50 to be performed in the future is very convenient.

Figure 4B:
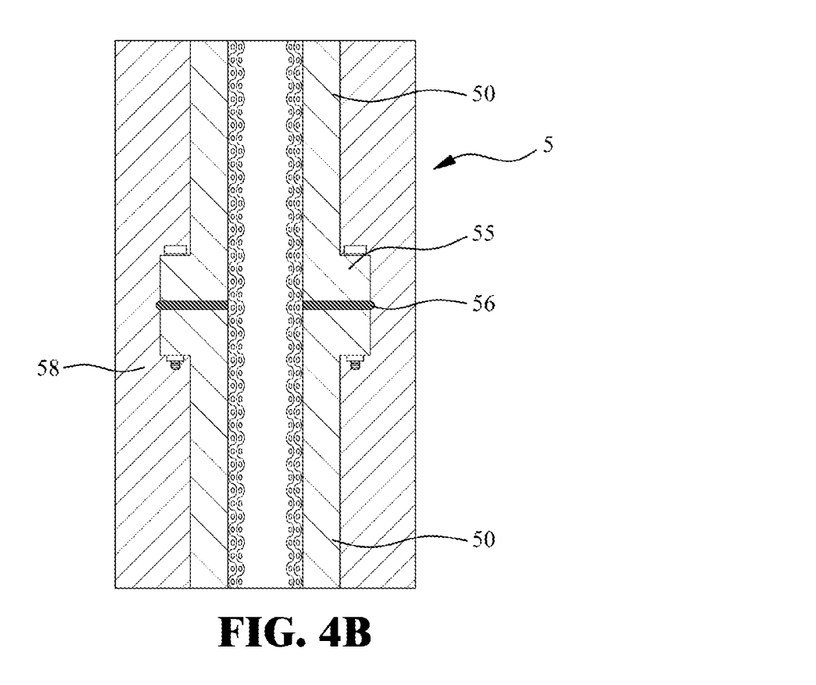
FIG. 4B is a schematic partial cross-sectional view of the heat conduction module according to another preferred embodiment of the present invention.

Reference is made to FIG. 4B, which a schematic partial cross-sectional view of the heat conduction module according to another preferred embodiment of the present invention. The present invention provides another method for assembling heat pipe sections 50, as shown in the figure, one end of each heat pipe section 50 is provided with a flange 55, the two heat pipe sections 50 are connected and then locked with bolts 57, and an airtight gasket 56 is arranged between the flanges 55 of the two heat pipe sections 50, thereby reducing the construction difficulty, effectively shortening the construction period and reducing costs.

On the other hand, in order to achieve anti-corrosion, anti-oxidation and anti-scaling, a thermally sprayed aluminum coating is specially applied to the outer surface of the heat pipe section 50 in this embodiment; furthermore, the heat pipe section 50 is externally covered with a heat insulation material 58, in this embodiment, two-phase and three-phase epoxy resin composite foam plastics are used as the heat insulation material 58, and of course, other materials such as polyurethane heat insulation material, heat insulation cotton and polylactic acid foam material can also be used. In other embodiments, in order to further improve the anti-corrosion, anti-scaling and heat insulation effects of the heat insulation material 58, a nano coating such as a coating of 30% acrylic resin water and 70% nano material, may be additionally applied, wherein the nano material may be multi-walled carbon nanotubes (MWCNTs). Similarly, the outer surface of the closed cavity 2 is also covered with the same heat insulation material 58 so as to prevent the high temperature in the hot spring well W from affecting the temperature of the closed cavity 2.

Reference is made to FIG. 1, which shows a heat dissipation module 6 located on the earth surface and connected to the second end 52 of the heat conduction module 5. The heat dissipation module 6 of this embodiment is heat dissipation fins, which can be installed in a building or other sheltered places to maintain the temperature in the closed cavity 2 lower than the atmospheric temperature or can be placed into a cooling pool to further reduce the temperature. In other words, by arrangement of the heat conduction module 5 and the heat dissipation module 6, the temperature in the closed cavity 2 can be maintained lower than the atmospheric temperature so that a specific temperature difference can be generated between the heat source end 31 and the cold source end 32 of the temperature differential mechanical power generation device 3 for automatic operation.

Figure 5:
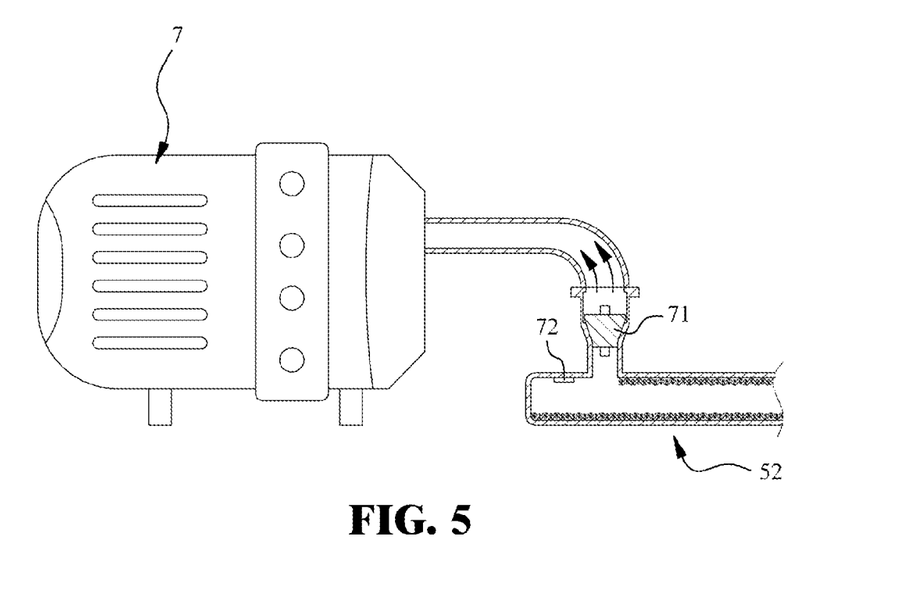
FIG. 5 is a schematic cross-sectional view of an evacuation module and a check valve according to a preferred embodiment of the present invention.

Reference is made to FIG. 1 and FIG. 5 together, FIG. 5 being a schematic cross-sectional view of an evacuation module and a check valve according to a preferred embodiment of the present invention; after a long period of operation, the vacuum degree in the heat pipe may decrease, in order to maintain the vacuum degree, an evacuation module 7, a check valve 71 and a negative pressure sensor 72 are also provided at the second end 52, when the pressure sensor 72 detects that the vacuum degree is lower than a specific value, the evacuation module 7 operates automatically, and the check valve 71 plays a role of only allowing gas discharge and preventing gas from flowing into the heat pipe. It should be noted that the evacuation module 71 does not operate all the times and would not be activated frequently, the actuation of the evacuation module 7 depends on the airtightness of the heat pipe, and usually, the evacuation module 7 may be activated once every few weeks or even few months so that the energy consumption is quite limited.

In addition, the working fluid in the heat conduction module 5 may be discharged as the evacuation module 7 operates, so in this embodiment, a fluid reservoir 73 is provided at the second end 52 so that working fluid can be added in time. reference is further made to FIG. 2 and FIG. 3, an upper fluid level detector 511 and a lower fluid level detector 512 are arranged at the first end 51 of the heat conduction module 5 in this embodiment for detecting the quantity of the working fluid in the heat conduction module 5, and the detailed operation method will be described in detail below.

It is additionally explained that, as shown in FIG. 1, the heat conduction module 5 is connected to the bottom of the heat dissipation module 6, the fluid reservoir 73 is connected to the middle position of the heat dissipation module 6, and the evacuation module 71 is connected to the top of the heat dissipation module 6. Due to the influence of the gravity on the fluid, the fluid condensed in the heat dissipation module 6 can smoothly flow back to the heat conduction module 5 positioned below. Moreover, when evacuation is being performed by the evacuation module 71, it can also prevent the evacuation module 71 from directly drawing out the working fluid in the heat conduction module 5.

Reference is made to FIG. 1, FIG. 2 and FIG. 3, described below is a monitoring system of this embodiment, which mainly includes a main controller 80, a first temperature sensor 81, a second temperature sensor 82, a third temperature sensor 83, the aforementioned negative pressure sensor 72, an upper fluid level detector 511 and a lower fluid level detector 512. The first temperature sensor 81 is disposed at the heat source end 31 of the temperature differential mechanical power generation device 3 and mainly used to measure the temperature of the heat source end 31, which is also the temperature of the heat source Sh in the hot spring well W; the second temperature sensor 82 is disposed in the closed cavity 2 and used to measure the temperature in the closed cavity 2, which is also the temperature of the cold source end 32 of the temperature differential mechanical power generation device 3; the third temperature sensor 83 is disposed at the second end 52 of the heat conduction module 5, and in an ideal state, the temperature measured by the third temperature sensor 83 should be almost the same as the temperature measured by the second temperature sensor 82.

As can be seen from the above, the main controller 80 can obtain various temperature and pressure parameters through the aforementioned sensors so as to determine whether the system or the environment is in a normal state. Furthermore, the upper fluid level detector 511 and the lower fluid level detector 512 are used to detect the quantity of the working fluid in the heat conduction module 5; when the quantity of the working fluid is insufficient, that is, the working fluid cannot be detected by the lower fluid level detector 511, the main controller 80 can control the switch of the fluid reservoir 73 to automatically replenish the working fluid; and when the working fluid is detected by the upper fluid level detector 511, that is, the quantity is sufficient, the main control 80 turns off the switch of the fluid reservoir 73.

This embodiment uses a non-contact fluid level detector, such as a non-contact capacitive sensor, which is capable of converting variable medium (such as fluid level) into a processable signal, and its principle is that when the working fluid is close to a sensitive surface of the capacitive sensor, the capacitance value changes, that is, the electric field around the active region changes, thereby forming a detection signal. Of course, the present invention can also use an electromagnetic induction fluid level detector, which has an electromagnetic coil that generates a magnetic field, and an electrode that captures an electromotive force (voltage), and when the working fluid passes through the magnetic field, an induced electromotive force is generated, thereby forming a detection signal.

Therefore, the non-contact fluid level detector used in this embodiment is not affected by the temperature, pressure, density, or viscosity of the liquid and is capable of detecting liquids containing contaminants (solids or gases) without causing liquid pressure loss, has no movable parts, and has high reliability. However, the present invention is not limited to the non-contact capacitive sensor, and other types of contact or non-contact fluid level detectors, such as photoelectric sensors, can also be used.

Moreover, FIG. 1 and FIG. 2 show a power conversion module 84, which is composed of various power conversion devices such as a rectifier, a transformer and a power converter, and by means of this module, the power generated by the generator set GS can be converted into a stable AC power to be fed into the mains grid or stored in energy storage equipment and then converted into a stable AC power to be fed into the mains grid.

In addition, it is worth mentioning that the top surface of the closed cavity 2 in this embodiment is provided with a hoisting ring 21, which can be used for hoisting the generator set GS; for example, when the system is installed, the generator set GS can be hoisted and placed into the hot spring well W by means of the hoisting ring 21; and when maintenance or repair is to be carried out, the generator set GS can also be hoisted out in a hoisting manner, so this is quite convenient.

Figure 6:
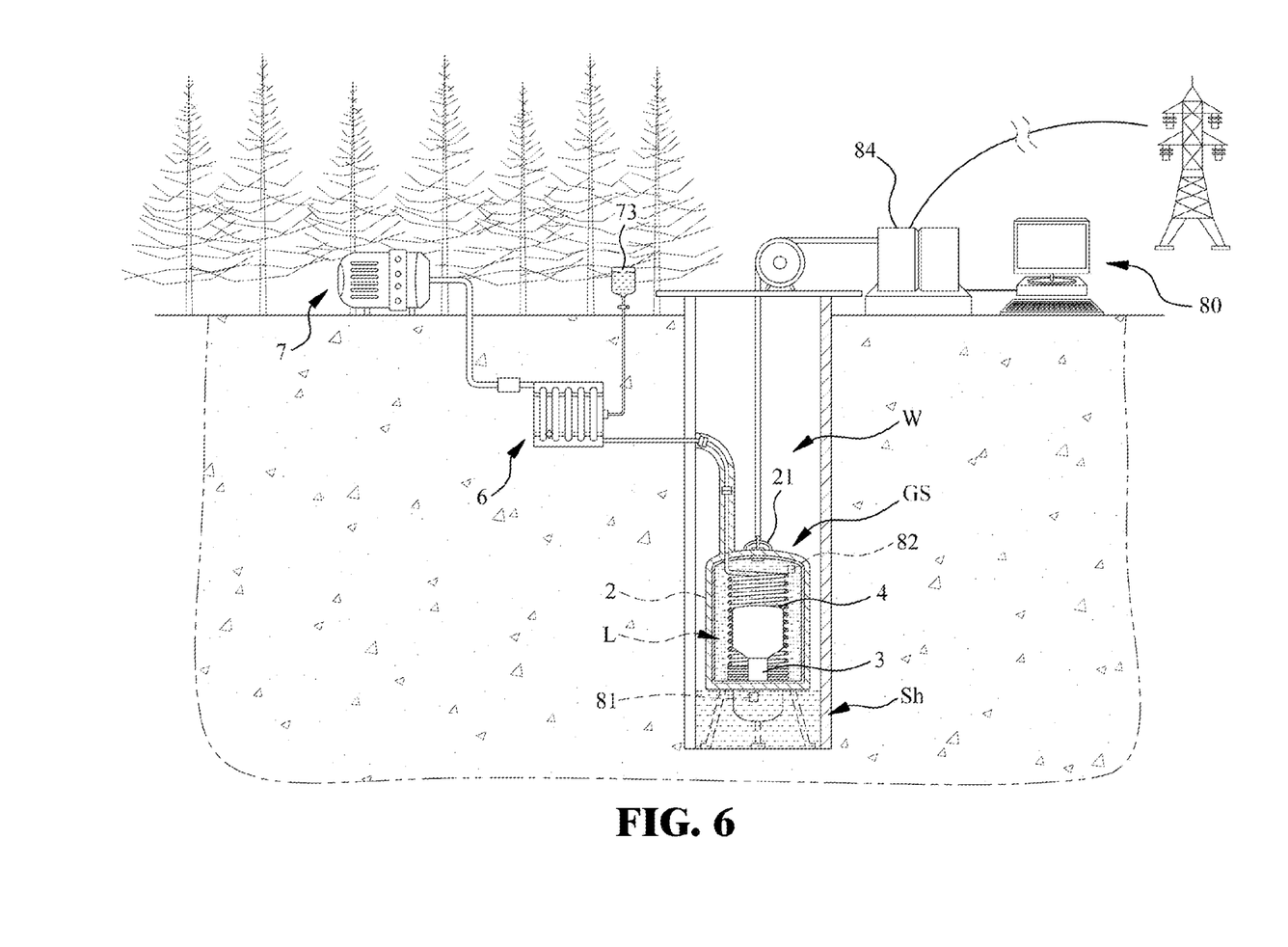
FIG. 6 is a schematic diagram of a second embodiment of the present invention.

Reference is made to FIG. 6, which is a schematic diagram of a second embodiment of the present invention; the main difference between this embodiment and the first embodiment lies in arrangement of the heat dissipation module, and the heat dissipation module of this embodiment is embedded in the ground at a depth of 0.5 m to 5 m measured from the earth surface. Taking Taitung County, Taiwan as an example, according to actual data, the temperature difference of soil at a depth of 60 cm measured from the earth surface between day and night does not exceed 1° C.; the temperature difference of soil at a depth of 100 cm measured from the earth surface between day and night is almost zero; and the temperature of soil at a depth of 5 m measured from the earth surface can be maintained at about 25° C. throughout the year. Therefore, this embodiment can provide a relatively stable low-temperature source, and the hot spring well W provides a stable high-temperature heat source Sh, so the system can be completely unaffected by the weather or the environment and can output stable power all the times.

Figure 7:
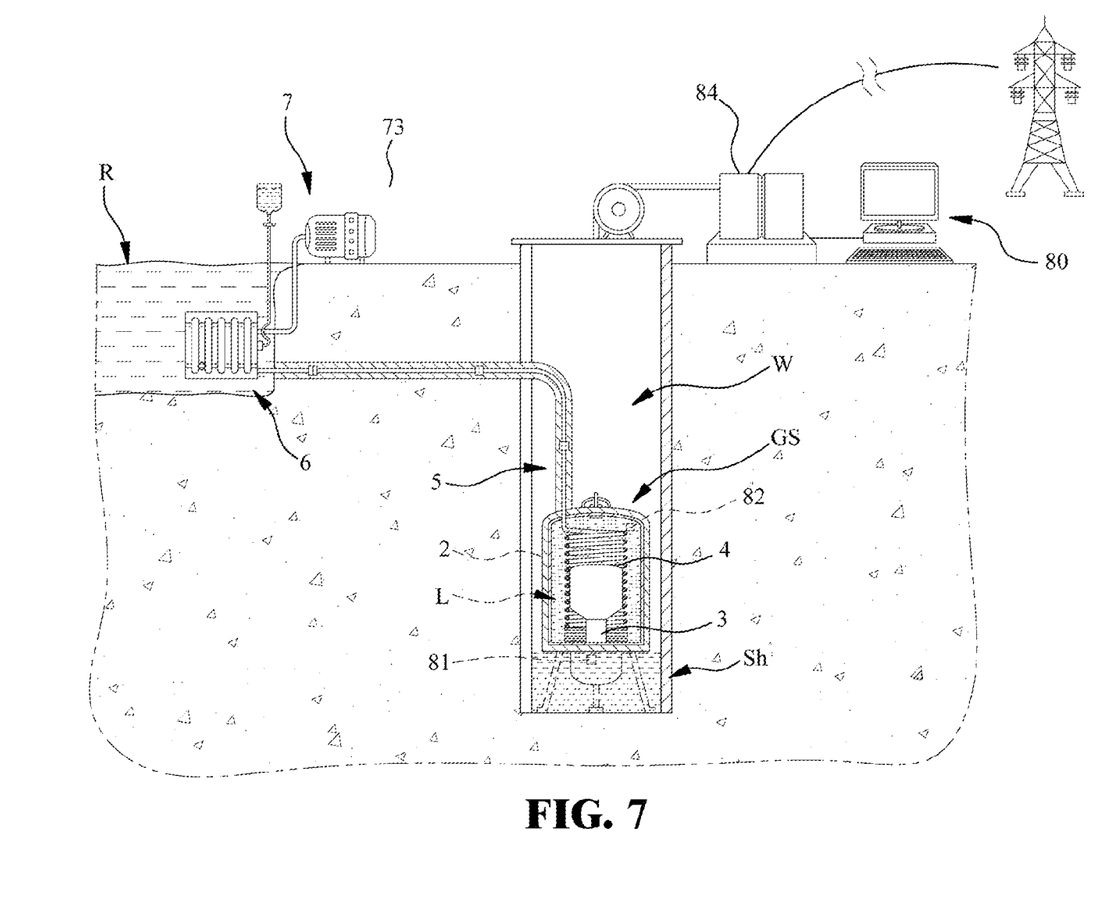
FIG. 7 is a schematic diagram of a third embodiment of the present invention.
Figure 8:
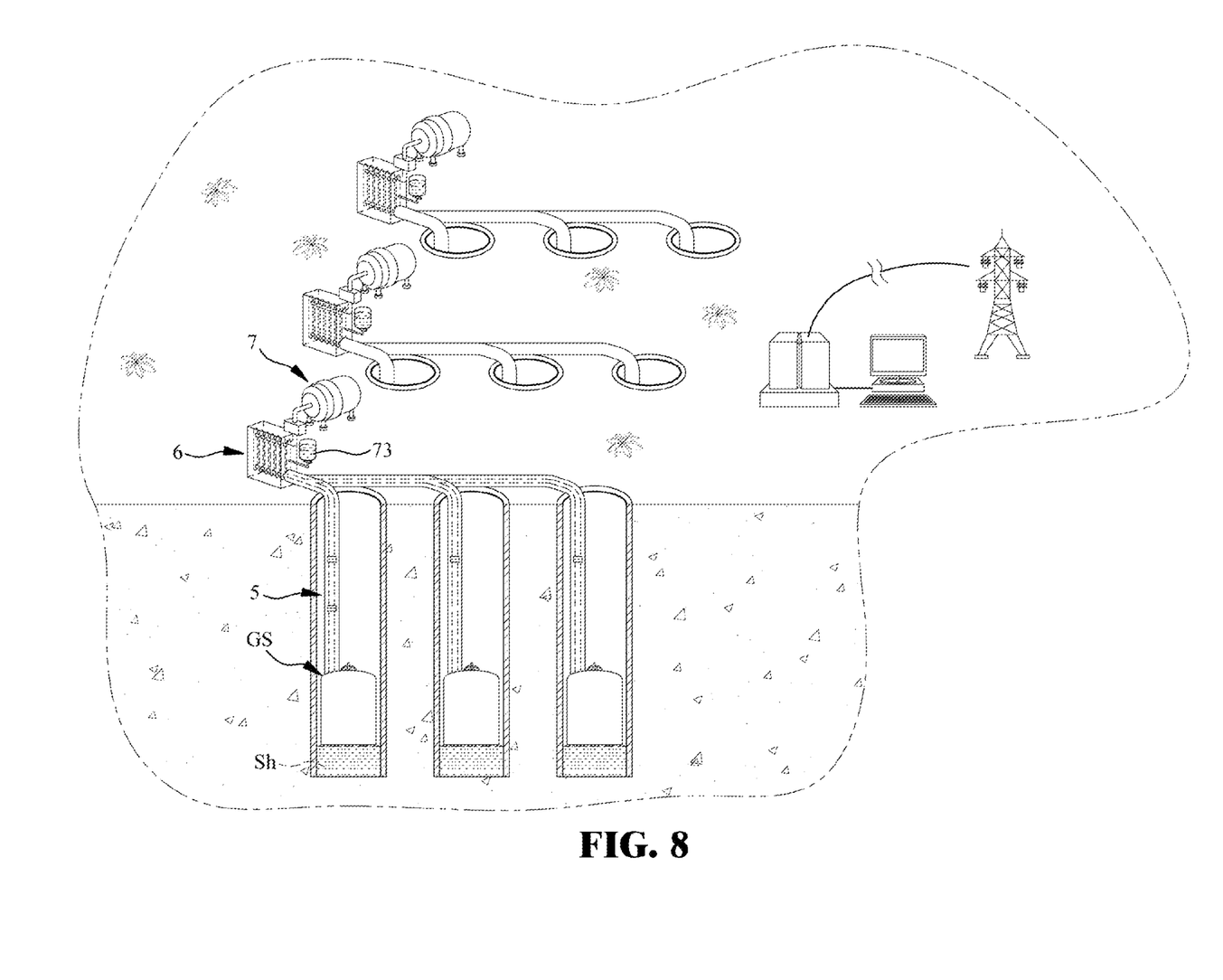
FIG. 8 is a schematic diagram of a fourth embodiment of the present invention.

Reference is made to FIG. 7, which is a schematic diagram of a third embodiment of the present invention; the main difference between this embodiment and the previous embodiments still lies in arrangement of the heat dissipation module 6, and the heat dissipation module 6 of this embodiment is immersed in water, such as a river, an ocean, a lake, or even an artificial water reservoir. Since the heat dissipation module 6 is immersed in a large amount of water, the water can be regarded as a low-temperature reservoir R, which provides a stable low-temperature source to maintain a relatively low temperature in the generator set GS. Taking the rivers in Taitung as an example, the monthly average water temperature is about 22.8° C., so they can be used as stable low-temperature sources. Reference is made to FIG. 8, which is a schematic diagram of a fourth embodiment of the present invention; and this embodiment is mainly used to illustrate that the system can also construct a medium or large-scale power station in the form of a plurality of generator sets. Specifically, due to the small size of the generator set GS, the diameter of the hot spring well W does not need to be too large, so a plurality of power generation systems can be deployed in the same hot spring area, as shown in FIG. 8, and the evacuation module 7, the power conversion module 84 and the main controller 80, etc. included can be shared. Moreover, since the power generation mode of this system does not need to extract the hot spring water, it would hardly cause damage to the environment and is capable of generating electricity sustainably, and in the case that the plurality of generator sets GS operate at the same time, the electricity generated will be considerable.

The above-mentioned embodiments are only examples for the convenience of description, and the scope of the present invention should be defined by the following claims, rather than limited to the above-mentioned embodiments.

What is claimed is:

1. A subterranean geothermal power generation system, comprising:
   a closed cavity, placed into a well, which provides a heat source;
   a temperature differential mechanical power generation device, which includes a heat source end and a cold source end, the temperature differential mechanical power generation device being disposed in the closed cavity, the heat source end being exposed from the closed cavity and brought into contact with the heat source, and the cold source end being located in the closed cavity;
   an electric power generation device, mechanically connected to the temperature differential mechanical power generation device and housed in the closed cavity, wherein when a temperature difference between the heat source end and the cold source end of the temperature differential mechanical power generation device reaches a specific value, the temperature differential mechanical power generation device mechanically drives the electric power generation device to generate and output electricity;
   a heat conduction module, including a first end and a second end, the first end being located in the closed cavity, and the second end extending out of the well; and
   a heat conduction fluid, filled into the closed cavity, the cold source end of the temperature differential mechanical power generation device, the electric power generation device and the first end of the heat conduction module are immersed in the heat conduction fluid.

2. The subterranean geothermal power generation system of claim 1, wherein the temperature differential mechanical power generation device is a Stirling engine, and the electric power generation device is a linear alternating current generator.

3. The subterranean geothermal power generation system of claim 1, wherein the heat conduction module is at least one selected from the group consisting of a heat pipe, a thermosiphon, a thermal conductive graphite sheet and a vapor chamber.

4. The subterranean geothermal power generation system of claim 1, further comprising a heat dissipation module, which is connected to the second end of the heat conduction module.

5. The subterranean geothermal power generation system of claim 4, wherein the heat dissipation module is exposed to air or immersed in water.

6. The subterranean geothermal power generation system of claim 4, wherein the heat dissipation module is embedded in ground at a depth of 0.5 m to 5 m measured from an earth surface.

7. The subterranean geothermal power generation system of claim 1, further comprising an evacuation module, which is connected to the second end of the heat conduction module, wherein the heat conduction module is a heat pipe, and the evacuation module is used for evacuating the heat pipe.

8. The subterranean geothermal power generation system of claim 7, further comprising a check valve and a negative pressure sensor, wherein the check valve is disposed between the evacuation module and the second end of the heat conduction module, and the negative pressure sensor is used for measuring a negative pressure in the heat conduction module.

9. The subterranean geothermal power generation system of claim 8, further comprising a main controller, a first temperature sensor, a second temperature sensor and a third temperature sensor, wherein the first temperature sensor, the second temperature sensor, the third temperature sensor and the negative pressure sensor are electrically connected to the main controller; the first temperature sensor is disposed at the heat source end of the temperature differential mechanical power generation device; the second temperature sensor is disposed in the closed cavity; the third temperature sensor is disposed at the second end of the heat conduction module.

10. The subterranean geothermal power generation system of claim 1, wherein the closed cavity and the heat conduction module each are externally covered with a heat insulation material.

\* \* \* \* \*